(12) United States Patent
Haddick

(10) Patent No.: US 11,160,202 B1
(45) Date of Patent: Nov. 2, 2021

(54) HANDHELD AERATION IMPLEMENT

(71) Applicant: Brandon Haddick, Syracuse, UT (US)

(72) Inventor: Brandon Haddick, Syracuse, UT (US)

( * ) Notice: Subject to any disclaimer, the term of this patent is extended or adjusted under 35 U.S.C. 154(b) by 4 days.

(21) Appl. No.: 16/908,311

(22) Filed: Jun. 22, 2020

(51) Int. Cl.
*A01B 1/24* (2006.01)

(52) U.S. Cl.
CPC .................... *A01B 1/243* (2013.01)

(58) Field of Classification Search
CPC ....................................... A01B 1/243
USPC ........................................... 172/21
See application file for complete search history.

(56) References Cited

U.S. PATENT DOCUMENTS

| | | | | |
|---|---|---|---|---|
| 1,893,258 A | * | 1/1933 | Washburn | A01B 1/243 172/21 |
| 1,965,177 A | * | 7/1934 | Finkl | A01B 1/24 172/21 |
| 5,228,400 A | * | 7/1993 | Luke | A01C 5/02 111/92 |

FOREIGN PATENT DOCUMENTS

| | | | | |
|---|---|---|---|---|
| GB | 213187 A | * | 3/1924 | A01B 1/165 |
| GB | 248911 A | * | 3/1926 | A01B 1/243 |
| GB | 481810 A | * | 3/1938 | A01B 1/243 |
| GB | 813630 A | * | 5/1959 | A01B 1/243 |

* cited by examiner

*Primary Examiner* — Tara Mayo-Pinnock
(74) *Attorney, Agent, or Firm* — Steven Rinehart

(57) ABSTRACT

A handheld aeration implement comprising an elongated shaft and handle cantilevering laterally from a top end of the elongated shaft, the aeration implement comprising a base assembly having an arcuate stabilizer, baseplate, and plurality of spikes adapted to punch holes in a ground surface.

8 Claims, 5 Drawing Sheets

HANDHELD AERATION IMPLEMENT

BACKGROUND

Field of the Invention

This invention relates to a novel and useful subsoil aerator, and more particularly relates to handheld implements adapted to be forced into a ground surface for the purpose of aeration.

Description of the Related Art

To properly maintain lawn, green surface, or turf, a caregiver must usually apply seed, fertilizer, water and sometimes pesticides. Turf which is frequently walked on and compacted can become impervious to full penetration of these materials to roots or subsoil. For this reason, compacted grass surfaces are often aerated; a mechanical processes involving punching holes into the surface of grass or turf (or thatch) to expose the subsoil, allowing water, oxygen, and fertilizer to penetrate the top surface, as well as facilitating softening of the top surface when the aerated holes close. Aeration can reduce disease and thatch growth.

Typically, large machines having reciprocating fuel-combustion engines are passed over a ground surface to aerate. These machines sometimes have rollers comprising protruding spikes, or plug removal spikes, adapted to pull plugs of grass from the ground surface and redeposit the plugs or to simply punch holes into the ground surface. These plugs are softer and moister than the top surface, and can create a muddy top surface. Sometimes, the black plugs interfere with aesthetically with the appearance of a putting green, or obstruct golf balls on a putting green. Putting greens, which are frequently walked on and in special need of aeration, are often not aerating using means known in the art, for these reasons.

There is a need in the art for a hand-operated aerator which can be selectively applied with precision to only small portions of turf or a putting green. Beneficially, such a device would be portable by a golfer or caregiver along with other golfing or gardening tools. It is therefore an object of the present invention to provide a handheld aeration implement.

SUMMARY

From the foregoing discussion, it should be apparent that a need exists for a handheld aeration implement. Beneficially, such a device would overcome inefficiencies with the prior art by providing a portable, effective means of selectively aerating small portions of turf. The present invention has been developed in response to the present state of the art, and in particular, in response to the problems and needs in the art that have not yet been fully solved by currently available apparti. Accordingly, the present invention has been developed to provide a handheld aeration implement comprising: an elongated shaft; an elongated tubular handle affixed at a midpoint to a proximal end of the shaft; a base assembly affixed to a distal end of the elongated shaft comprising: an arcuate stabilizer defining an aperture through which the elongated shaft traverses, the arcuate stabilizer arching over a top surface of the baseplate and affixed at two ends to a baseplate; the baseplate affixed to the elongated shaft and arcuate stabilizer, the baseplate having a planar bottom surface and a sidewall circumscribing the baseplate, the sidewall defining a plurality of threaded bores for receiving bolts adapted to secure spike within the baseplate, the baseplate further defining a plurality of bores on the lower surface adapted to receive spikes; a plurality of detachable spikes affixed within the bores to the baseplate, the spikes adapted to punch holes in a ground surface.

Each spike may form part of a set of two spikes and each set of two spikes is staggered across the lower surface of the baseplate. The baseplate may define a plurality of recesses around the perimeter between sets of spikes.

In some embodiments, the arcuate stabilizer comprises two L-shaped members each defining a semicircular recess for receiving an outer surface of the elongated shaft.

The handheld aeration implement may further comprise a plurality of arcuate stabilizers. Each arcuate stabilizer may be affixed to a differing point on one of the top surface of the baseplate and a sidewall of the baseplate.

The baseplate may be one of rectangular and circular. The spikes may affix to the baseplate at irregularly-spaced intervals in an irregularly-shaped pattern.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
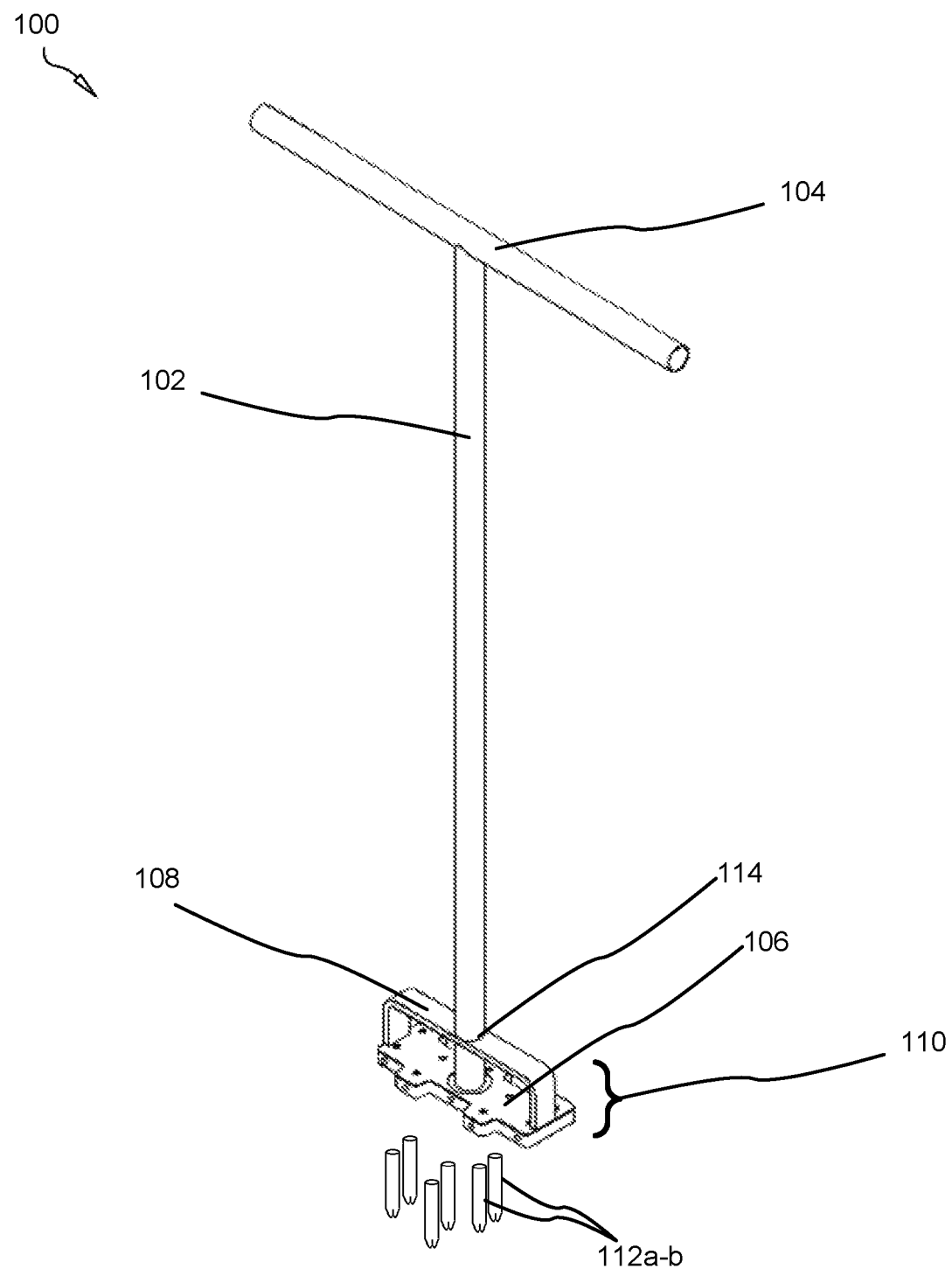
FIG. 1 is an isometric perspective view of a handheld portable aerator in accordance with the present invention.
Figure 2:
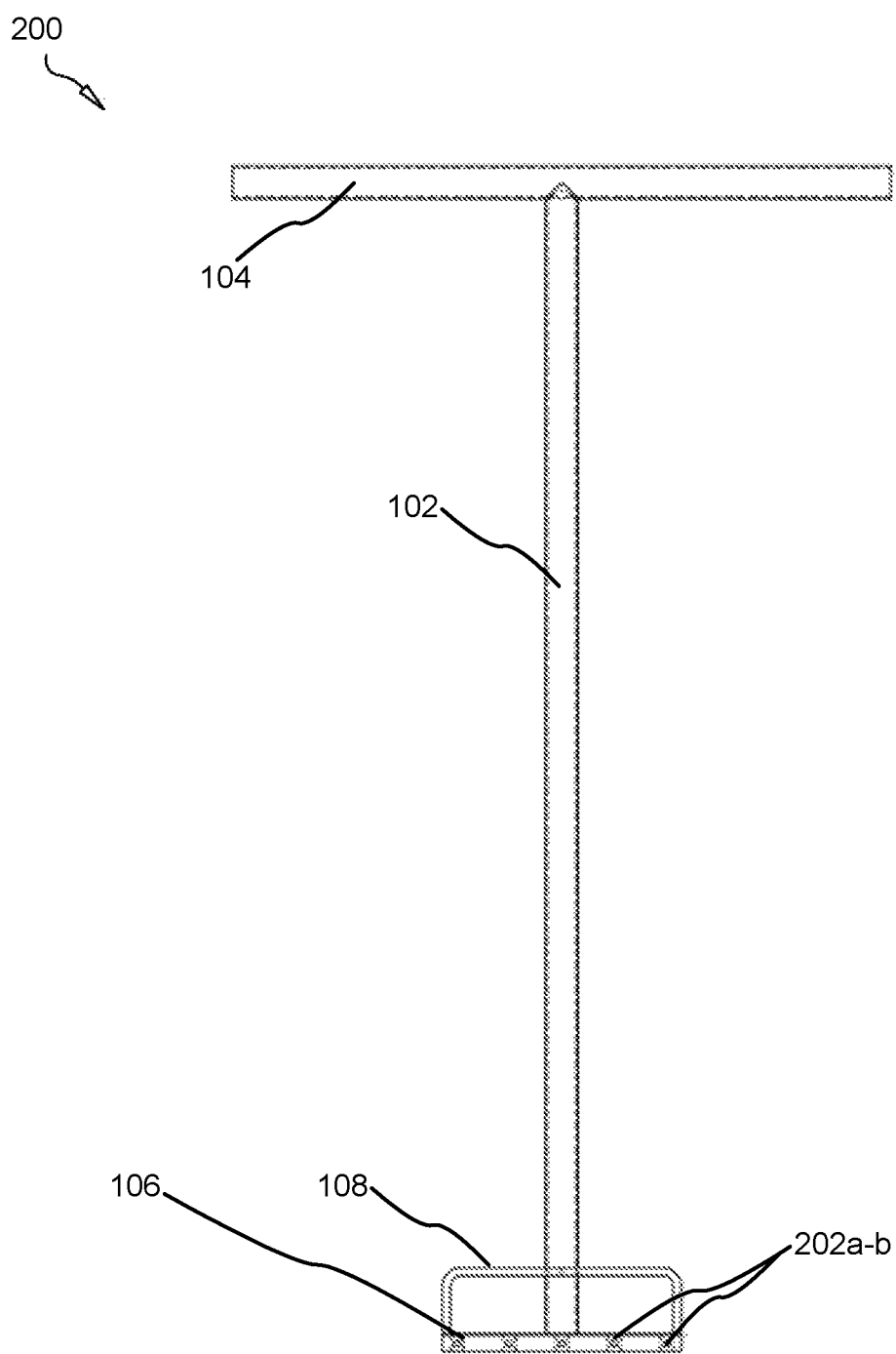
FIG. 2 is a front perspective view of a handheld portable aerator in accordance with the present invention.

FIGS. 1-2 illustrate an isometric perspective view and a side perspective view respectively of a handheld portable aerator 100 in accordance with the present invention.

The aerator 100 comprises an elongated shaft 102, a horizontal handle 104, and a base assembly 110 comprising an arcuate stabilizer 108, a baseplate 106, and a plurality of spikes 112.

The arcuate stabilizer 108 defines an aperture (or bore) 114 through which the elongated handle 102 passes. The arcuate stabilizer 108 formed an U-shaped or arcuate beam which affixes at both ends (proximal and distal) to a top surface of the baseplate 106. In some embodiments, the arcuate stabilizer 108 is formed as a single integrated piece with the baseplate 106.

In various embodiments, the base assembly 110 may comprise a plurality of arcuate stabilizers 108, each affixed at a different point on the perimeter or top surface of the baseplate 106.

The elongated shaft 102 and the handle 104 comprise a T-shaped assembly in which the elongated shaft 102 is affixed at a midpoint to the handle 104. Distal and proximal ends of the handle 104 cantilever, or overhang, the elongated shaft 102, providing leverage to an operator seeking to twist the apparatus 100 or push down on it with two hands spaced apart.

The elongated shaft 102 and handle 104 may be fabricated partially or entirely from a metal or metal alloy such as steel, titanium or leather; polymeric materials; or organic materials (such as wood, leather or resin).

Figure 3:
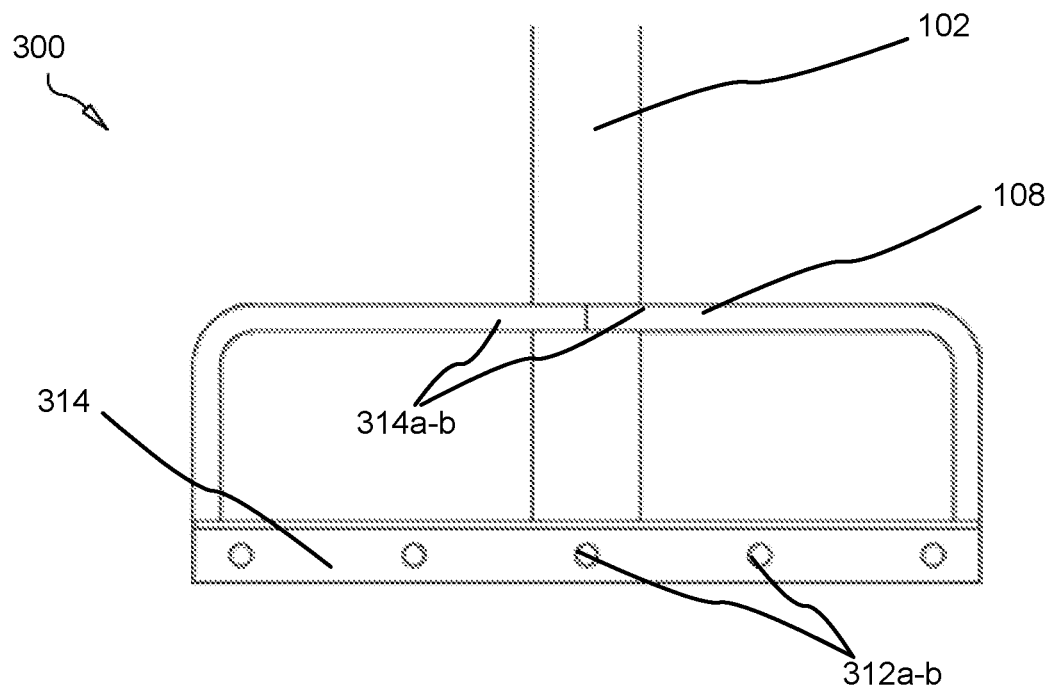
FIG. 3 is a front perspective view of a base assembly of a handheld portable aerator in accordance with the present invention.
Figure 4:
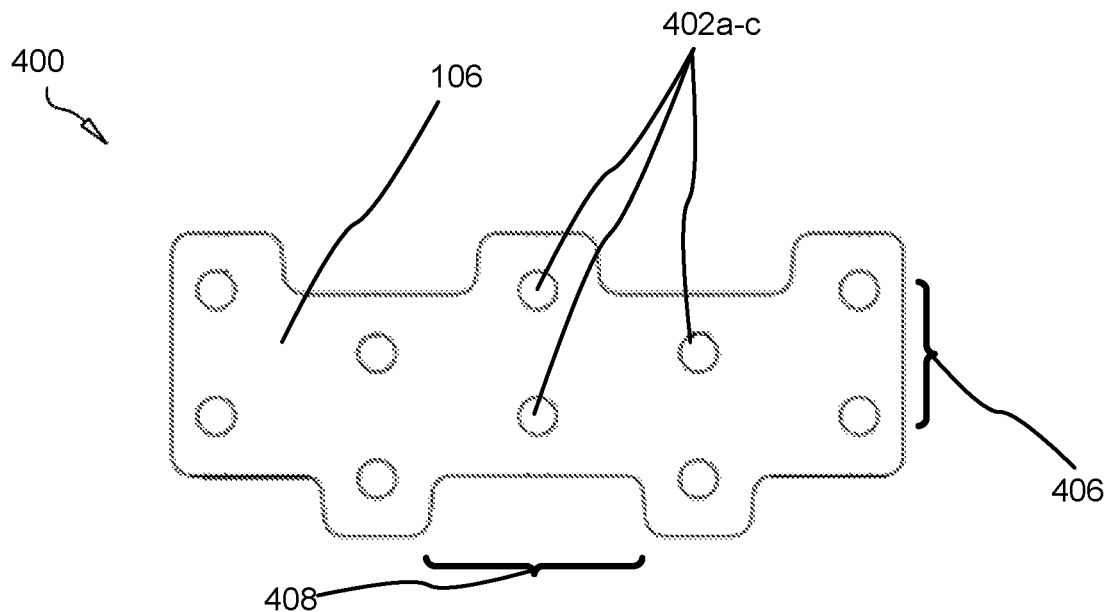
FIG. 4 is a lower perspective view of a base assembly of a handheld portable aerator in accordance with the present invention.

FIGS. 3-4 illustrate a front and lower perspective view of the base assembly of a handheld portable aerator 300 in accordance with the present invention.

The baseplate 106 defines a plurality of bores 402 on a lower surface adapted to receive the spikes 112. The spikes are arranged in sets 406 of two. Each set 406 of spikes 112 is staggered (offset across the lower plane) from an adjacent set 406 of spikes.

The baseplate 106 itself may not be rectangular from a lower perspective. As shown in FIG. 4, the baseplate 106 defines a plurality of recesses 608 around the perimeter of the baseplate 106 between sets 406 of spikes 112.

Additionally, the baseplate 106 comprises a plurality of threaded bores 202 circumscribing the perimeter of the baseplate 106. These threaded bores 202 travel laterally into the sidewalls of the baseplate 106 and are adapted to receive bolts or screws for the purpose of securing spikes 112 in the bores 406. As such, the threaded bores 202 and the bores 406 interconnect within the baseplate 106 such that a screw inserted into a threaded bore 202 presses against, and forms a friction fit therewith, a proximal end of a spike 112 inserted into a bore 406. There is one bore 202 for each bore 406.

In some embodiments, the arcuate stabilizer 108 comprises two L-shaped components 314a-b, each joined at the elongated shaft 102, each defining a semicircular recess adapted to circumscribed half of the outer surface of the elongated shaft 102, all to create nonuniform aeration across a ground surface 502.

In some embodiments, the threaded bores 312 alternate between a recessed portion of the baseplate 106 and a nonrecessed portion of the baseplate 106 such that every odd threaded bore 312 traverses the baseplate from a differently-spaced lateral entry point that every even threaded bore 312.

Figure 5:
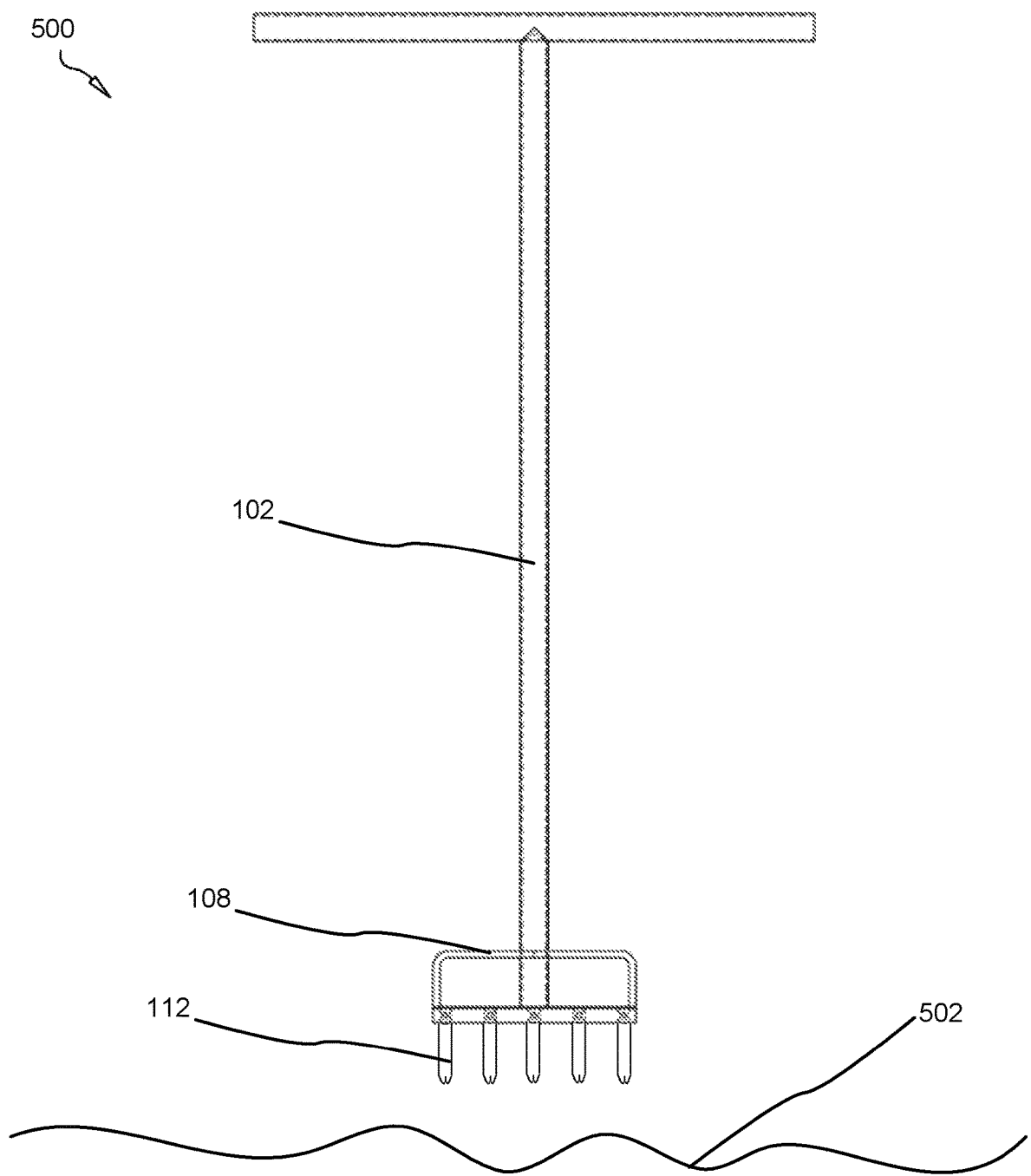
FIG. 5 is an environmental, side perspective view of a base of a handheld portable aerator in accordance with the present invention.

FIG. 5 is an environmental, side perspective view of a base of a handheld portable aerator 500 in accordance with the present invention.

The apparatus 500 may be forced into a ground surface 502 as shown to aerate (or aerify) the surface.

Figure 6:
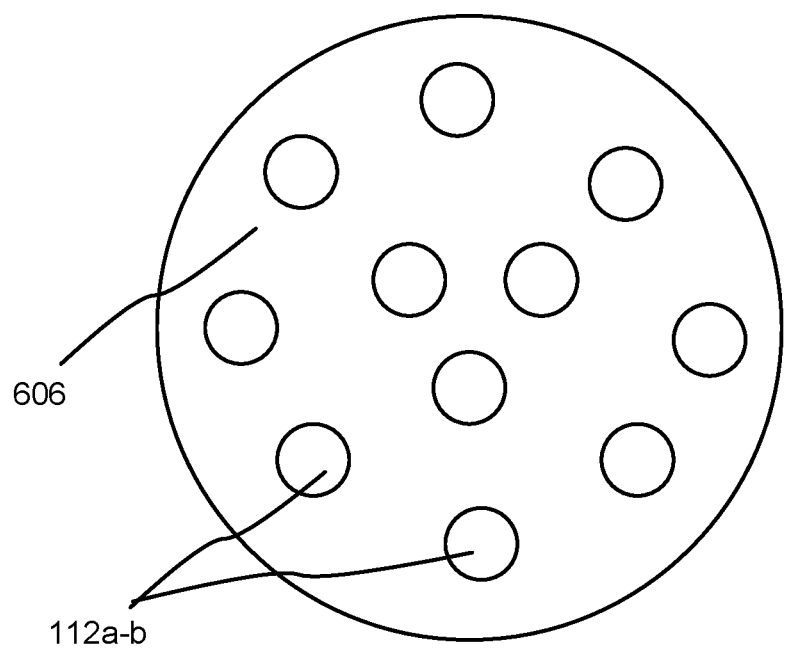
FIG. 6 is a lower perspective view of a base of a handheld portable aerator 600 in accordance with the present invention.

FIG. 6 is a lower perspective view of a base of a handheld portable aerator 600 in accordance with the present invention.

In various embodiments, the baseplate 606 may be circular from a lower perspective (but otherwise substantially the same as baseplate 106). The spikes 112 may be arranged in circles around the lower surface of the baseplate 606 or may be irregularly spaced and irregularly-patterned in their arrangement on the baseplate 606. The baseplate 606 may also be triangular, square, polygonal, or irregularly-shaped. Even in the circular baseplate 606 may define the recesses 408 circumscribing the baseplate.

The baseplate 606 may be fabricated from a metal or metal alloy, polymeric materials, or organic materials (such as wood, leather or resin).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A handheld aeration implement comprising:
   an elongated shaft;
   an elongated tubular handle affixed at a midpoint to a proximal end of the shaft;
   a base assembly affixed to a distal end of the elongated shaft comprising:
      an arcuate stabilizer defining an aperture through which the elongated shaft traverses, the arcuate stabilizer arching over a top surface of a baseplate and affixed at two ends to the baseplate;
      the baseplate affixed to the elongated shaft and arcuate stabilizer, the baseplate having a planar bottom surface and a sidewall circumscribing the baseplate, the sidewall defining a plurality of threaded bores for receiving bolts adapted to secure spike within the baseplate, the baseplate further defining a plurality of bores on the lower surface adapted to receive spikes;

a plurality of detachable spikes affixed within the bores to the baseplate, the spikes adapted to punch holes in a ground surface.

2. The handheld aeration implement of claim 1, where each spike forms part of a set of two spikes and each set of two spikes is staggered across the lower surface of the baseplate.

3. The handheld aeration implement of claim 2, wherein the baseplate defines a plurality of recesses around the perimeter between sets of spikes.

4. The handheld aeration implement of claim 1, wherein the arcuate stabilizer comprises two L-shaped members each defining a semicircular recess for receiving an outer surface of the elongated shaft.

5. The handheld aeration implement of claim 1, further comprising a plurality of arcuate stabilizers.

6. The handheld aeration implement of claim 5, wherein each arcuate stabilizer is affixed to a differing point on one of the top surface of the baseplate and a sidewall of the baseplate.

7. The handheld aeration implement of claim 1, wherein the baseplate is one of rectangular and circular.

8. The handheld aeration implement of claim 1, wherein the spikes affix to the baseplate at irregularly-spaced intervals in an irregularly-shaped pattern.

\* \* \* \* \*